United States Patent
Yamada

(10) Patent No.: US 11,151,157 B2
(45) Date of Patent: Oct. 19, 2021

(54) DATABASE MANAGEMENT METHOD

(71) Applicant: MURAKUMO CORPORATION, Tokyo (JP)

(72) Inventor: Hiroyuki Yamada, Tokyo (JP)

(73) Assignee: MURAKUMO CORPORATION, Meguro-ku (JP)

(*) Notice: Subject to any disclaimer, the term of this patent is extended or adjusted under 35 U.S.C. 154(b) by 652 days.

(21) Appl. No.: 16/117,860

(22) Filed: Aug. 30, 2018

(65) Prior Publication Data

US 2018/0373775 A1    Dec. 27, 2018

Related U.S. Application Data

(60) Division of application No. 14/478,610, filed on Sep. 5, 2014, now Pat. No. 10,102,263, which is a
(Continued)

(51) Int. Cl.
*G06F 16/00* (2019.01)
*G06F 16/27* (2019.01)
(Continued)

(52) U.S. Cl.
CPC .............. *G06F 16/27* (2019.01); *G06F 16/21* (2019.01); *G06F 16/211* (2019.01); *G06F 16/2343* (2019.01)

(58) Field of Classification Search
None
See application file for complete search history.

(56) References Cited

U.S. PATENT DOCUMENTS 5,504,899 A    4/1996  Raz
6,772,154 B1   8/2004  Daynes et al.
(Continued)

FOREIGN PATENT DOCUMENTS

EP    2410431 A1    1/2012
JP    05-143434 B2    6/1993
(Continued)

OTHER PUBLICATIONS

Takashi Inoue, "System Kanri no Genba de Sugu ni Tsukaeru Jissen Knowhow! Shin Kino Quick Master Windows Server2003 Dai 11 Kai Shadow Copy Kino de Ukkari Sakujo ni Taisho suru, Windows Server World", Sep. 1, 2004, vol. 9, pp. 128 to 131 with English partial translation of p. 128, lines 1 to 26 of 1st Section (8 pages).
(Continued)

*Primary Examiner* — Debbie M Le
(74) *Attorney, Agent, or Firm* — Westerman, Hattori, Daniels & Adrian, LLP

(57) ABSTRACT

A lower-level master node sends, to a higher-level master node, a table-based write set as a bundle of combinations of a shadow copy of the database and a heap tuple map expanded in a memory, and the higher-level master node that received the write set verifies whether the update has already been executed and sends the record of this update to the lower-level master node as a transaction log including a table number, whereby the database can be updated efficiently and consistently from the lower-level master node to the higher-level master node, and from the higher-level master node to the lower-level master node under its control.

10 Claims, 17 Drawing Sheets

Related U.S. Application Data continuation of application No. PCT/JP2012/055923, filed on Mar. 8, 2012.

(51) Int. Cl.
*G06F 16/21* (2019.01)
*G06F 16/23* (2019.01)

(56) References Cited

U.S. PATENT DOCUMENTS

| | | | |
|---|---|---|---|
| 6,990,503 | B1 | 1/2006 | Luo et al. |
| 7,269,593 | B2* | 9/2007 | Minamino .......... G06F 16/2445 |
| 8,396,880 | B2* | 3/2013 | Williamson .......... G06F 16/283 |
| | | | 707/755 |
| 8,612,450 | B1* | 12/2013 | Proffit ................ H04N 21/4828 |
| | | | 707/740 |
| 8,620,868 | B2* | 12/2013 | Mikkelsen ............ G06F 16/282 |
| | | | 707/661 |
| 8,838,534 | B2 | 9/2014 | Fowler |
| 9,400,814 | B2* | 7/2016 | Martinsson .......... G06F 16/2228 |
| 9,418,240 | B2* | 8/2016 | Mikkelsen .......... G06F 21/6218 |
| 9,703,829 | B2* | 7/2017 | Isomatsu .......... G06F 16/2228 |
| 10,102,263 | B2* | 10/2018 | Yamada .............. G06F 16/2343 |
| 2003/0041227 | A1 | 2/2003 | Nakamatsu |
| 2003/0187881 | A1 | 10/2003 | Murata et al. |
| 2004/0236746 | A1 | 11/2004 | Lomet |
| 2010/0191884 | A1 | 7/2010 | Holenstein et al. |
| 2012/0011098 | A1 | 1/2012 | Yamada |

FOREIGN PATENT DOCUMENTS

| | | | |
|---|---|---|---|
| JP | 11-085597 | A | 3/1999 |
| JP | 11-143762 | A | 5/1999 |
| JP | 2002-149459 | A | 5/2002 |
| JP | 2003-296171 | A | 10/2003 |
| JP | 2005-071238 | A | 3/2005 |
| JP | 2006-164097 | A | 6/2006 |
| JP | 2006-293910 | A | 10/2006 |
| JP | 2009-230404 | A | 10/2009 |
| JP | 2011-248584 | A | 12/2011 |
| WO | 2010/106991 | A1 | 9/2010 |
| WO | 2013/076819 | A1 | 5/2013 |

OTHER PUBLICATIONS

International Search Report (Form PCT/ISA/210) of International Application No. PCT/JP2012/055923 dated Jun. 12, 2012.
Notification of Transmittal of Translation of the International Preliminary Report on Patentability (Form PCT/IB/338) of International Application No. PCT/JP2012/055923 dated Sep. 18, 2014 with Forms PCT/IB/373 and PCT/ISA/237.
International Search Report (Form PCT/ISA/210) of International Application No. PCT/JP2011/076940 dated Dec. 20, 2011.
Extended European Search Reports dated Aug. 11, 2015, issued in counterpart European Patent Application No. 12870808.8 (10 pages).
Extended European Search Reports dated Aug. 11, 2015, issued in counterpart European Patent Application No. 15162210.7( 10 pages).
Office Action dated Jul. 25, 2017, issued in counterpart Japanese Application No. 2016-123887, with English translation. (6 pages).

* cited by examiner

*FIG. 6*

| XB1 | D14 | U157 | XC1 | ————————— |

FIG. 9

| XB1 | D114 | U1257 | XC1 | - - - - - - |

DATABASE MANAGEMENT METHOD

CROSS-REFERENCE TO RELATED APPLICATION

This application is a Divisional Application of U.S. application Ser. No. 14/478,610, filed on Sep. 5, 2014, which is a Continuation Application of International Application PCT/JP2012/055923 filed on Mar. 8, 2012 and designated the U.S., the entire contents of which are incorporated herein by reference.

FIELD

The present invention relates to a database management method, and in particular relates to a method of managing a database in which a plurality of master nodes are hierarchically connected by a network.

BACKGROUND

The present applicant took particular note of the technology of managing a database using a transaction log, and proposed a data synchronization method based on a one-to-one master/slave system in Japanese Patent Application Publication No. 2006-293910, and subsequently proposed a data synchronization method based on a one-to-N (wherein N is a positive integer) master/slave system in WO No. 2010/106991.

Here, a transaction log refers to the technology of realizing high-speed operations while maintaining the permanence of changes by recording the history of changes made to the database in an area that is different from the recording area of the database.

In particular, Japanese Patent Application Publication No. 2006-293910 focused on realizing a replication system by using a transaction log, and, with WO 2010/106991, a slave node that received a search command from a client sends a request message to a master node, the slave node requests the master node to send a transaction log up to the latest version of the update of the master database when the slave node does not receive a return message from the master node within a predetermined time, the master node that received the foregoing request sends the requested transaction log to the slave node, and the slave node refers to the received log and updates its own replica database.

SUMMARY

Meanwhile, WO 2010/106991 was based on the premise of being a network configuration in which its node configuration comprises a plurality of mirror nodes to one master node.

Thus, since the mirror node would never independently execute data update instructions (INSERT, UPDATE, DELETE), the slave node only had to update its own database by referring to the transaction log from the master node.

Meanwhile, pursuant to the diversity and complexity of databases, a so-called multi master system comprising a plurality of master nodes is attracting attention. With respect to this point, in a network configuration where the master nodes have symmetric properties (when the master nodes are of a parallel structure), proposed is a theory of prioritizing the update information among the master nodes, and synchronizing the master nodes. However, the procedures for synchronizing all nodes are complex, and the solution during contention was not realistic.

The present inventor devised the present disclosure in light of the foregoing circumstances. Thus, the technical object of this disclosure is to realize a database management method capable of hierarchically building the master nodes, and using such hierarchical structure to reliably and efficiently update the database between the nodes even in cases where a plurality of tables of the lower-level master node are updated.

The present disclosure adopted the following measures to achieve the foregoing object.

One aspect of the present disclosure is a method of managing a database which is a recordable database hierarchically including higher-level and lower-level master nodes in which records can be updated, comprising: a step of a database processing unit of a predetermined lower-level master node generating and sending, to a higher-level master node, a table-based write set as a bundle of combinations of a shadow copy and a heap tuple map for each table of a database expanded in its own memory, when an instruction for updating a plurality of tables of the database is issued in the predetermined lower-level master node; a step of the higher-level master node comparing the heap tuple map of each table in the table-based write set received from the lower-level master node and its own database, and verifying whether a corresponding row of the corresponding table of the database registered as a target has been updated by a different table-based write set; a step of aborting the entire table-based write set sent from the predetermined lower-level master node when the update has been performed, updating the corresponding row of the corresponding table of the database of the higher-level master node using the shadow copy of each table in the table-based write set when the update has not been performed, and generating a record of this update including a table number of the higher-level master node as a transaction log; a step of distributing the transaction log to the lower-level master nodes including the lower-level master node which has sent the table-based write set; and a step of a transaction log processing unit of the lower-level master node updating the corresponding row of the corresponding table of its own database based on the received transaction log.

One aspect of the present disclosure is a method of managing a database which is a recordable database hierarchically including higher-level and lower-level master nodes in which records can be updated, comprising: a step of a database processing unit of a predetermined lower-level master node generating and sending, to a higher-level master node, a single integrated write set of a shadow copy and a heap tuple map containing table numbers of a database expanded in its own memory, when an instruction for updating a plurality of tables of the database is issued in the predetermined lower-level master node; a step of the higher-level master node comparing the heap tuple map in the integrated write set received from the lower-level master node and its own database, and verifying whether a corresponding row of the table corresponding to the table number of the database registered as a target has been updated by a different integrated write set; a step of aborting the entire integrated write set when the update has been performed in any of the tables, updating the table corresponding to the table number of the database of the higher-level master node using the shadow copy of the integrated write set when the update has not been performed, and generating a record of this update including a table number with the higher-level master node as a transaction log; a step of distributing the transaction log to the lower-level master nodes including the lower-level master node which has sent the integrated write set; and a step of a transaction log processing unit of the lower-level master node updating the corresponding row of the corresponding table of its own database based on the received transaction log.

One aspect of the present disclosure is the method of managing a database, wherein the shadow copy of each table included in the table-based write set in the lower-level master node is configured only from newly added rows.

One aspect of the present disclosure is the method of managing a database, wherein the shadow copy of the integrated write set in the lower-level master node is configured only from newly added rows.

One aspect of the present disclosure is the method of managing a database, wherein, in a stage where the table-based write set is being generated in the lower-level master node, when search processing is performed on a table of a master database of that lower-level master node, the method executes: a step of the database processing unit of the lower-level master node referring to the table of the master database; and a step of referring to the heap tuple map corresponding to the table to determine whether the corresponding row number has been entered in the search processing, setting the table of the master database as a direct search target when the corresponding row number has not been entered, and, when the corresponding row number has been entered, determining whether the entry is a deletion command or an update command, and removing the corresponding row number from the search target when the entry is the deletion command, and setting the entry of the shadow copy corresponding to the table in the heap tuple map as the search target when the entry is the update command.

One aspect of the present disclosure is the method of managing a database, wherein, in a stage where the integrated write set is being generated in the lower-level master node, when search processing is performed on a table of a master database of that lower-level master node, the method executes: a step of the database processing unit of the lower-level master node referring to the table of the master database; and a step of referring to the heap tuple map to determine whether the corresponding row number of the corresponding table has been entered in the search processing, setting the master database as a direct search target when the corresponding row number has not been entered, and, when the corresponding row number has been entered, determining whether the entry is a deletion command or an update command, and removing the corresponding row number from the search target when the entry is the deletion command, and setting the entry of the shadow copy in the heap tuple map as the search target when the entry is the update command.

One aspect of the present disclosure is the method of managing a database, wherein, in a stage where the table-based write set is being generated in the lower-level master node, when search processing is performed on a table of a master database of that lower-level master node, the method executes: a step of the database processing unit of the lower-level master node referring to the table of the master database; a step of referring to the whole heap tuple map corresponding to the table, extracting entries of row numbers to be the search target, and removing the all entered row numbers from the search target on the assumption that the row numbers have been deleted; and a step of referring to the shadow copy corresponding to the table, referring to row numbers of entries that have been added in the shadow copy, and setting only those row numbers as the search target.

One aspect of the present disclosure is the method of managing a database, wherein, in a stage where the integrated write set is being generated in the lower-level master node, when search processing is performed on a table of a master database of that lower-level master node, the method executes: a step of the database processing unit of the lower-level master node referring to the table of the master database; a step of referring to the whole heap tuple map, extracting entries having the table number and the row number to be the search target, and removing the all entered row numbers from the search target on the assumption that the row numbers have been deleted; and a step of referring to the shadow copy, referring to row numbers of entries of the table to be the search target that have been added in the shadow copy, and setting only those row numbers as the search target.

One aspect of the present disclosure is the method of managing a database, wherein, when the table-based write set or the integrated write set is generated in the lower-level master node, an area of a backend memory (BEM) in the lower-level master node for registering the table-based write set or the integrated write set can be referred to at least by the transaction log processing unit which executes an update instruction based on the transaction data distributed from the higher-level master node, and when the transaction log processing unit refers to the backend memory (BEM) and when a corresponding row of a table to be updated based on the update instruction is contained in the heap tuple map (HTM) of the corresponding table of the table-based write set, or contained in the heap tuple map (HTM) of the integrated write set, the transaction log processing unit aborts the transaction that is generating that heap tuple map (HTM).

One aspect of the present disclosure is a method of managing a database which is a recordable database hierarchically including higher-level and lower-level master nodes which can be updated, comprising: a step of registering in a write set, in a session of any one of lower-level master nodes, table information to be updated in the database of the lower-level master node, and sending the write set to the higher-level master node; a step of the higher-level master node notifying, when an instruction for locking a table of a database is generated, the lower-level master node of information of the locking, and storing the locking information in the higher-level master node; a step of the higher-level master node comparing table information in the write set received from the lower-level master node and the stored locking information, and aborting the write set when there is contention; a step of the lower-level master node, which has received the locking information from the higher-level master node, aborting a transaction in the lower-level master node when that transaction contends with the locking information; and a step of the lower-level master node acquiring a lock of the target table based on the locking information from the higher-level master node.

According to the present disclosure, multi master nodes are hierarchically built, a shadow copy and a heap tuple map expanded in its own memory are sent as a write set from a lower-level master node to a higher-level master node, the higher-level master node that received the foregoing write set verifies whether the relevant row has been previously updated by a different write set, and performs database update processing by using the shadow copy and heap tuple map if the relevant row has not been updated. In addition, as a result of the higher-level master node sending the record of this update as a transaction log to the lower-level master node, the database can be updated efficiently and consistently from the lower-level master node to the higher-level master node, and from the higher-level master node to the lower-level master node under its control. In particular, the present disclosure is effective in cases where a plurality of tables are updated with a higher-level master node and a lower-level master node.

BRIEF DESCRIPTION OF THE DRAWINGS

FIG. 6 is a diagram showing the transaction log that is generated by the higher-level master node of Embodiment 1;

FIG. 9 is a diagram showing the transaction log corresponding to a plurality of tables;

DESCRIPTION OF EMBODIMENTS

Embodiment 1

The present disclosure is now explained with reference to the appended drawings.

Figure 1:
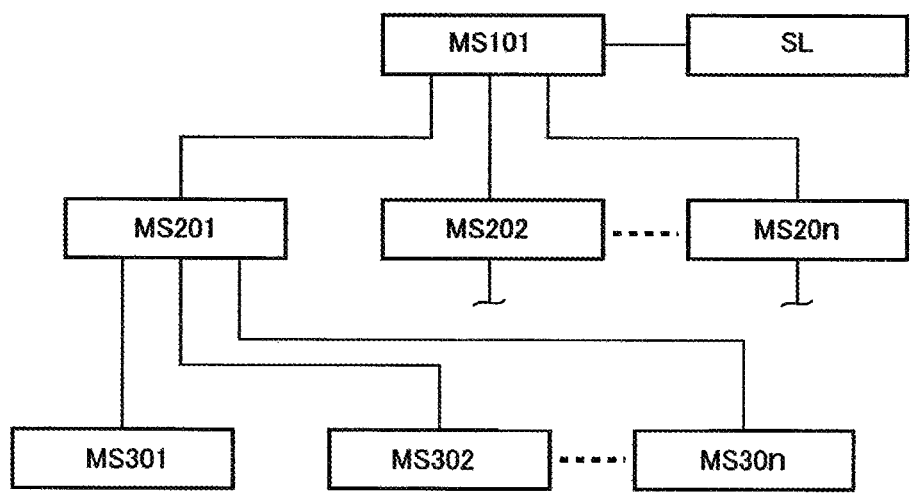
FIG. 1 is a conceptual diagram showing the database structure of the hierarchical master nodes according to Embodiment 1 of the present disclosure.

FIG. 1 shows the structure of the hierarchical master nodes of this embodiment. As shown in FIG. 1, the node configuration where lower-level master nodes (MS201, MS202, . . . , MS20n and MS301, MS302, . . . , MS30n) are hierarchically provided below a higher-level master node (MS101) is adopted. Each node (information processing apparatus) includes a database. Moreover, the higher-level master node (MS101) includes a slave, and the other lower-level master nodes may also include a slave. With this kind of master/slave configuration, the update management technology of PCT/JP2010/054311 (earlier application of WO 2010/106991 by the present applicant) may be applied for updating the databases between the master node and the slave.

While foregoing WO 2010/106991 only needs to copy (replicate) the transaction log of the master node to the lower-level nodes, this embodiment is unique in that attention was focused on the fact that, with a configuration of hierarchical multi master nodes, when an update instruction is also being executed in the lower-level master nodes, the consistency of all lower-level nodes cannot be maintained only by referring to the transaction log from the higher-level node. This is explained below.

Figure 2:
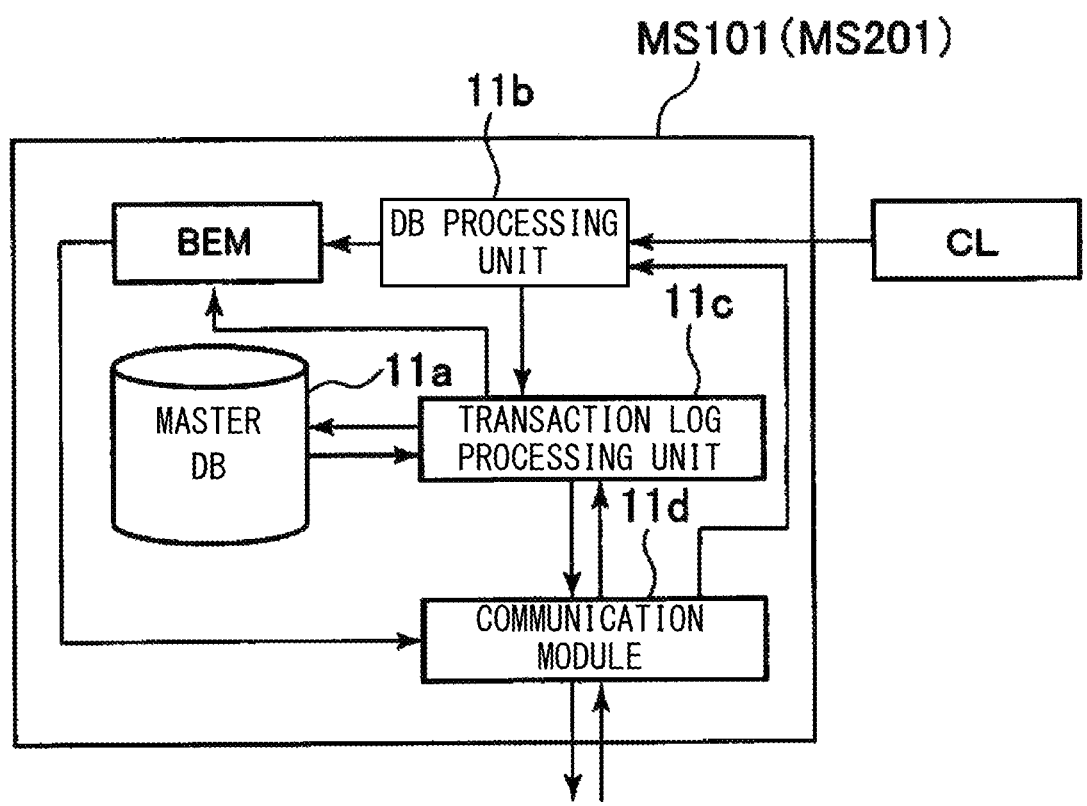
FIG. 2 is a functional block diagram of the master node of Embodiment 1.

FIG. 2 is a functional block diagram of the lower-level master node (MS201), and the higher-level master node (MS101) also has similar functions.

Figure 4:
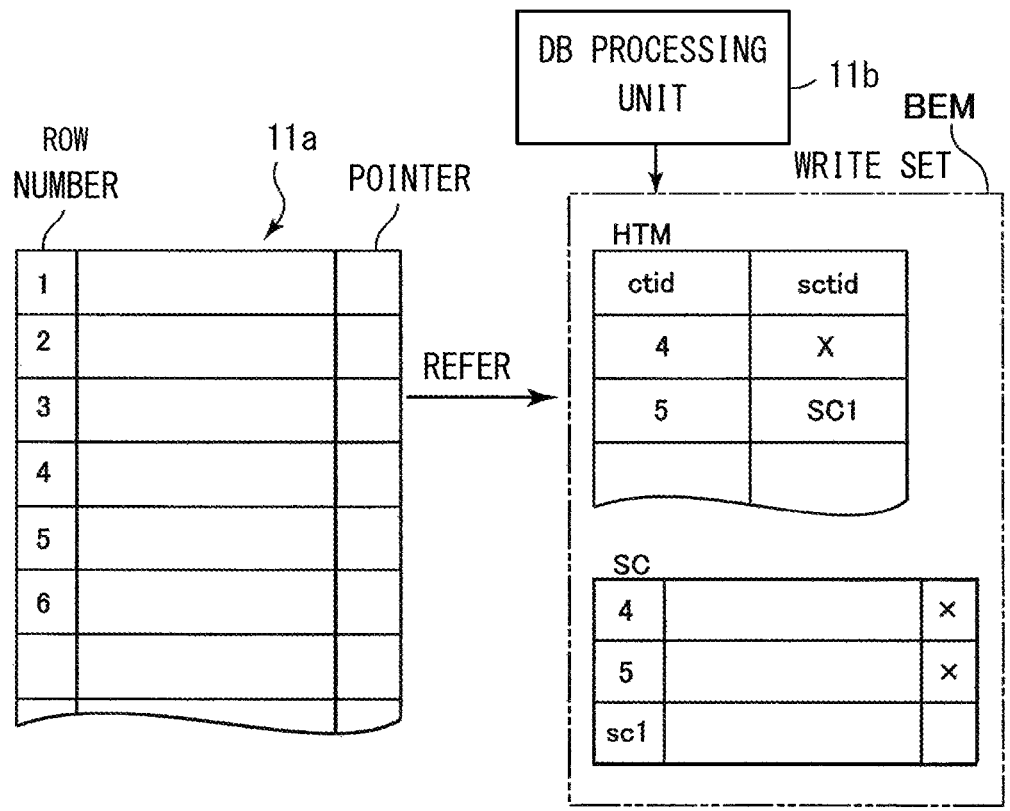
FIG. 4 is a diagram showing the relationship between the page of the database of the lower-level master node of Embodiment 1 and the generated write set (heap tuple map (HTM) and shadow copy (SC))

As shown in FIG. 2, when an instruction for updating the database is input from a client (CL), a database processing unit (11b) generates a write set in a backend memory (BEM) created in a main memory (MM). This write set is configured from a heap tuple map (HTM) and a shadow copy (SC) as shown in FIG. 4. Here, let it be assumed that update instructions for deleting (DELETE) row number 4 of a master database (11a) and rewriting (UPDATE) row number 5 with a new value (sc1) were input.

Here, the database processing unit 11b sends the write set, which was generated in the backend memory (BEM), to the higher-level master via a communication module (11d) without directly writing data into a master database (11a) while referring to the master database (11a).

This kind of processing is performed in the higher-level master node (MS101), as well as in the lower-level master nodes (MS201, MS202, . . . , MS20n and MS301, MS302, . . . , MS30n).

Figure 3:
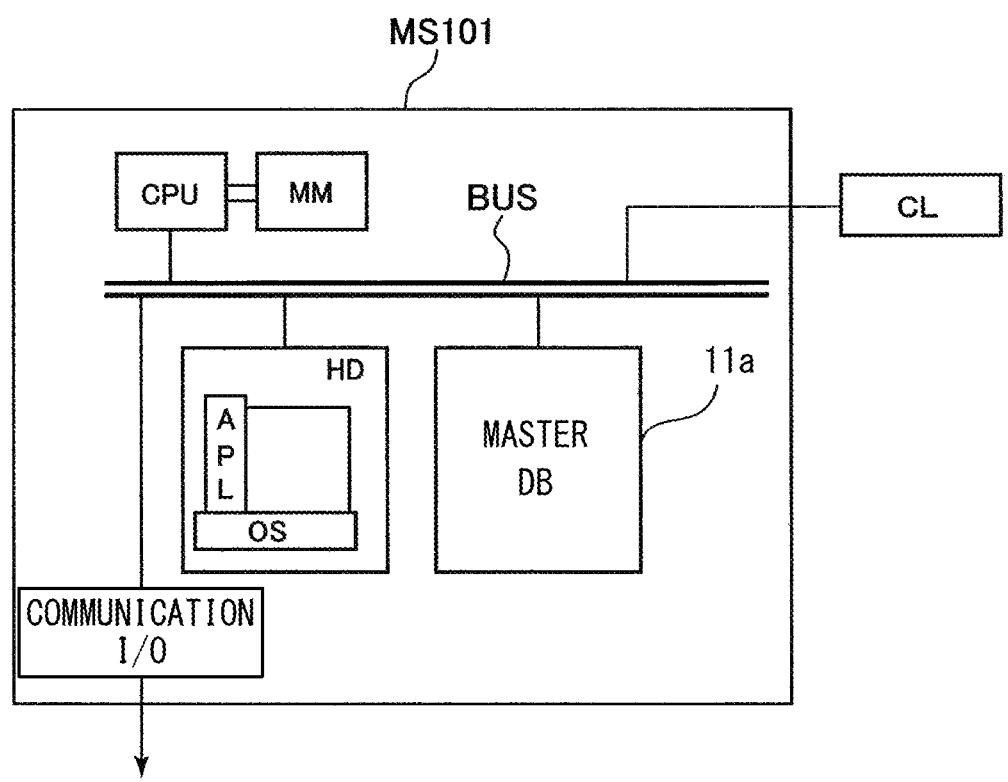
FIG. 3 is a hardware block diagram of the master node of Embodiment 1.

FIG. 3 shows the hardware configuration for realizing the foregoing functions. The higher-level master node (MS101) is a general purpose information processing apparatus, and includes a large-scale hard drive (HD), a master database (11a), and a communication interface (I/O) (communication module 11d) for communicating with the outside which are connected via a BUS around a central processing unit (CPU) and a main memory (MM). Note that a client terminal (CL) is connected via the BUS or the communication interface (I/O) for receiving instructions. Note that the master database (11a) may be configured on the large-scale hard drive (HD), or configured on the main memory (MM). In other words, there is no limitation in where the master database (11a) may be configured.

The large-scale hard drive (HD) stores an operating system (OS) as well as application programs (APL), and the functions as the foregoing master node are realized by the central processing unit (CPU) reading and sequentially executing the programs via the BUS and the main memory (MM). Note that, although the explanation is omitted, the lower-level master nodes (MS201, MS202, . . . , MS20n and MS301, MS302, . . . , MS30n) are also configured the same.

The processing performed by the database processing unit (11b) explained with reference to FIG. 2 is now explained in detail with reference to FIG. 4. Note that, while the ensuing explanation is based on the premise that only on a single table is updated based on a predetermined transaction in the lower-level master node in order to simplify the explanation of the generation of a write set in the lower-level master node, with an enormous database system it is common practice to update a plurality of tables with one transaction, and a plurality of tables are updated with one transaction in both the higher-level master node and the lower-level master node. This point will be explained later with reference to FIG. 7 to FIG. 9.

FIG. 4 shows the relationship of the master database (11a) in the lower-level master node (MS201), and the write set. The master database (11a) is configured from row numbers, instructions, and a pointer and is a recordable database in which a row number is added each time a new instruction is given from the client terminal (CL). FIG. 4 shows the case explained above where row number 4 is deleted (DELETE) and row number 5 is rewritten according to the new instruction (UPDATE to sc1).

In the lower-level master node (MS201), when this kind of update instruction is given to the master database based on instructions from the client terminal (CL), as described above, a write set configured from a heap tuple map (HTM, heap file) and a shadow copy (SC) is generated in the backend memory (BEM).

The original row number (ctid) and the row number (sctid) of the new row are associated and registered in the heap tuple map (HTM). The heap tuple map (HTM) is additionally generated each time the database is updated. Note that, since the row number to which the instruction (sc1) of row number 5 is to be written is still unknown at this stage, a new instruction (sc1) is written in sctid.

Meanwhile, the shadow copy (SC), which contains the row number to be rewritten by referring to the master database (11a), is generated. Here, since the row number to be newly added is still unknown at this stage, a new instruction (sc1) is written in the row number.

Note that, at this stage, since the database processing unit (11b) of the lower-level master node (MS201) knows that row number 4 to which the DELETE instruction is applied and old row number 5 to which the UPDATE instruction is applied will be deleted based on the generation of the heap tuple map (HTM), it is also possible to only write the new instruction (sc1) as the shadow copy (SC).

The write set generated as described above is sent from the lower-level master node (MS201) to the higher-level master node (MS101).

Figure 5:
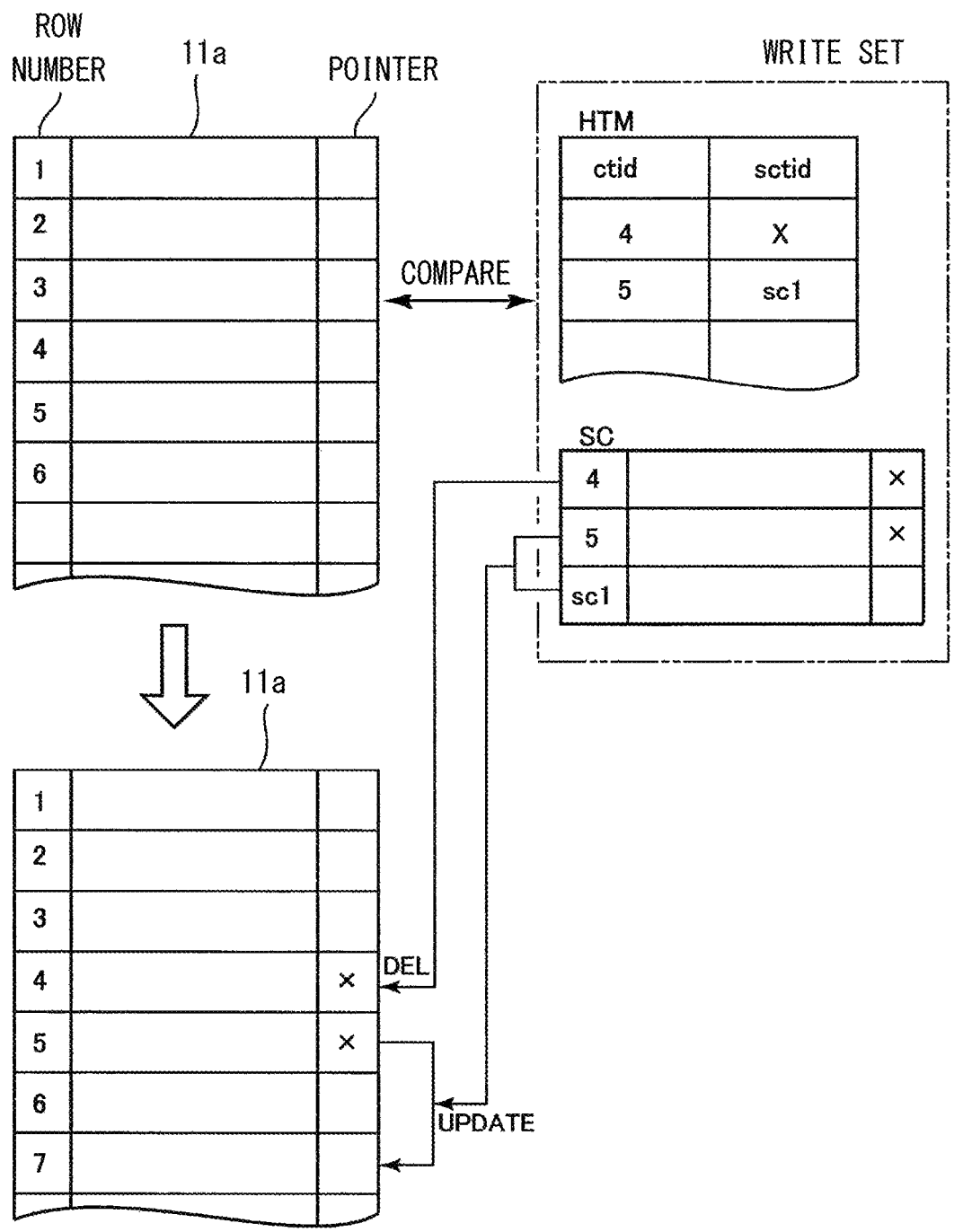
FIG. 5 is an explanatory diagram upon updating the higher-level master node by using the write set sent from the lower-level master node in Embodiment 1.

In the higher-level master node (MS101), when the database processing unit 11b (central processing unit (CPU)) receives the write set from the lower-level master node (MS201), it activates the transaction log processing unit (11c) pursuant to the update instruction and starts the generation of transaction log. In addition, the database processing unit 11b reads the heap tuple map (HTM) from the received write set, and compares it with its own master database (11a). Here, whether the contents of the target tuples (row numbers 4, 5 and 7 in this case) have been updated in the master database (11a) is verified. In FIG. 5, since row numbers 4 to 6 have not yet been updated, a deletion pointer is given to row number 4, and a deletion pointer is also given to old number 5 to be rewritten. In addition, a new instruction (sc1) is written in new row number 7.

Meanwhile, upon comparing the heap tuple map (HTM) in the write set from the lower-level master node (M201) and its own database, if the relevant row has already been updated in higher-level master node (M201) based on a different write set, the processing based on that write set is aborted (stopped).

Figure 6:
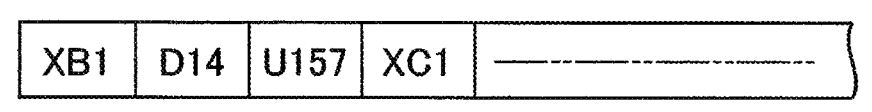

FIG. 6 shows an example of the transaction log that is generated by the transaction log processing unit (11c) when the master database (11a) of the higher-level master node (MS101) is updated as described above. This transaction log is a file in which at least the instruction and transaction (row number and the processing executed thereto) are sequentially recorded in a time series.

According to FIG. 6, subsequent to the instruction (XB1) for starting the transaction, a log in which the instruction number and the row number configuring a part is being generated sequentially. For example, row number 4 is foremost deleted (D14) as the DELETE instruction (D1), row number 5 is subsequently deleted as the UPDATE instruction (U1), row number 7 is added (U157), and, finally, the commitment instruction (XC1) thereof is issued.

This transaction log is distributed from the communication module (11d) to the lower-level master node (MS201) which has sent the write set, as well as to all lower-level master nodes (MS202, . . . , MS20n and MS301, MS302, . . . , MS30n).

The lower-level master nodes that received the transaction log copy (replicate) such transaction log in their own database.

Specifically, when a lower-level master node (M202, for instance) receives the transaction log shown in FIG. 6 with the communication module (11d), it activates the transaction log processing unit (11c) and replicates the transaction log in its own master database (11a). Consequently, a deletion pointer is given to row numbers 4 and 5, and a new row number 7 is added.

Accordingly, in the lower-level master nodes, the databases are uniformly managed by replicating the transaction log sent from the higher-level master node.

While the foregoing explanation was based on the premise that the only a single table is updated based on a predetermined transaction in the lower-level master node in order to simplify the explanation of the generation of the write set in the lower-level master node, a case where a plurality of tables are updated is now explained with reference to FIG. 7 to FIG. 9.

Figure 7:
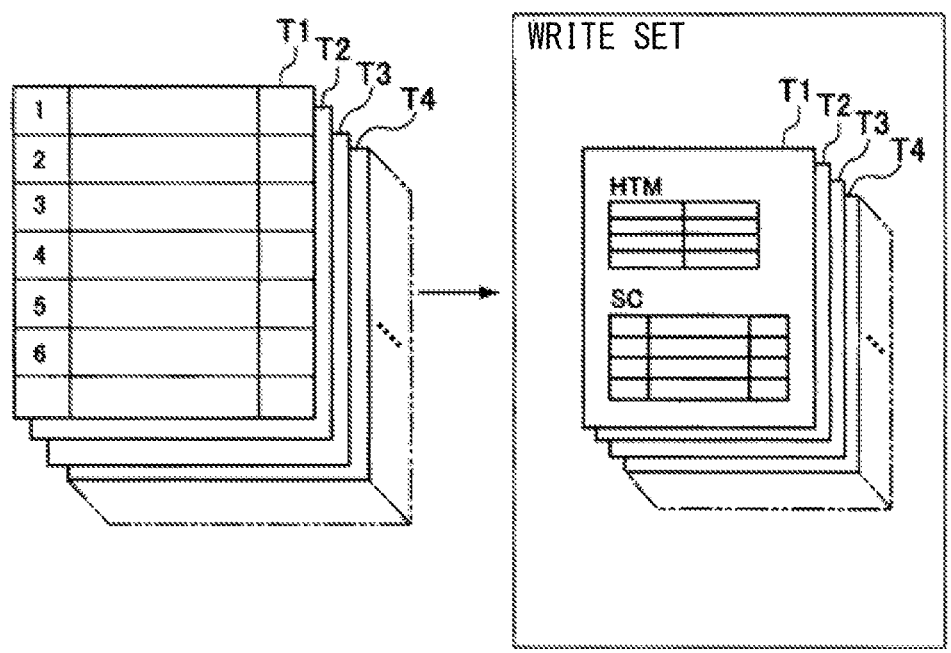
FIG. 7 is a modified example of Embodiment 1, and an explanatory diagram of a case where the write set is generated for each table (table-based write set)
Figure 8:
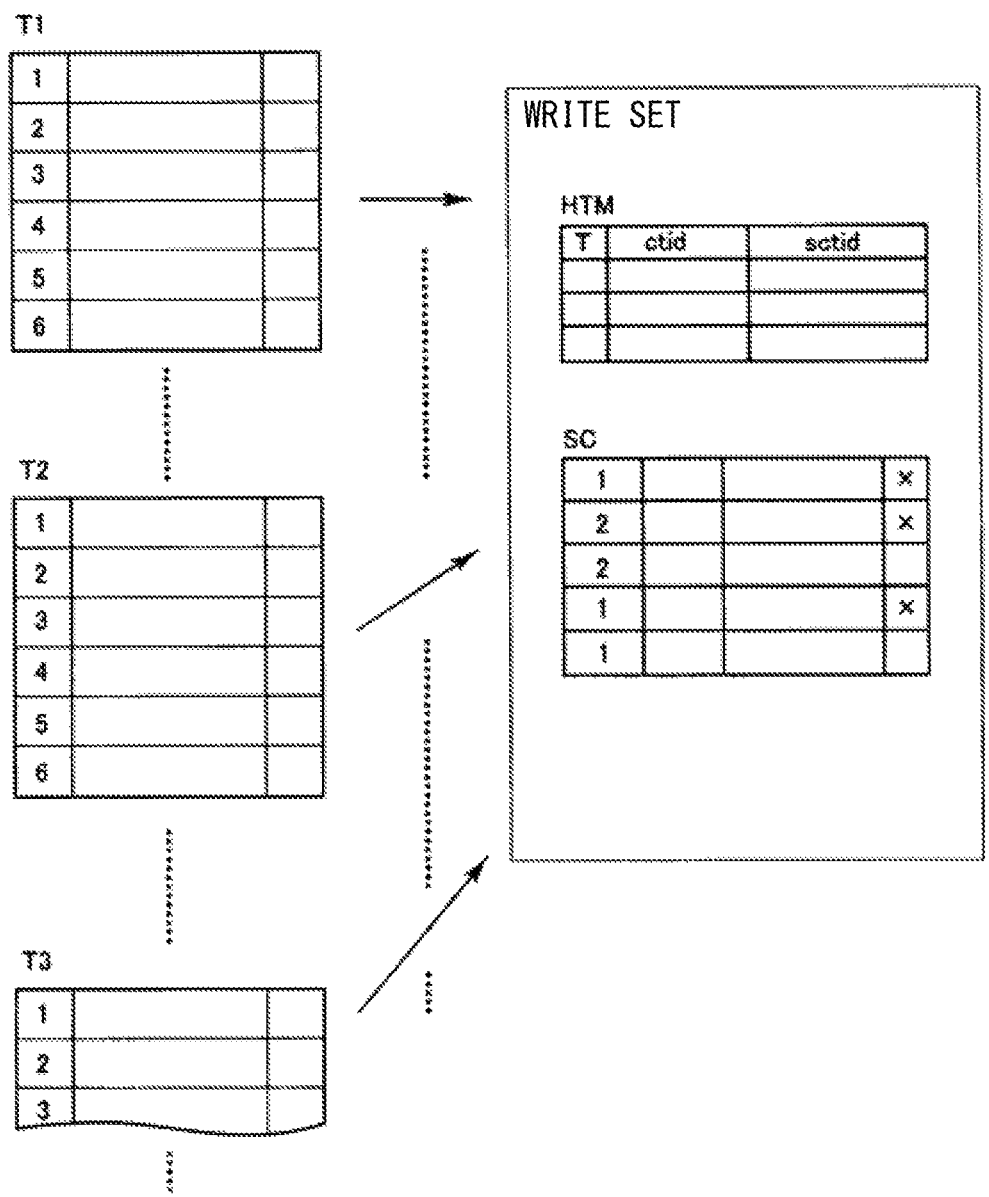
FIG. 8 is a modified example of Embodiment 1, and an explanatory diagram of a case where a table number is added within a single write set (integrated write set)

FIG. 7 and FIG. 8 are diagrams corresponding to the plurality of tables, and FIG. 7 shows a method of sending, to the higher-level master node, a write set as a bundle of combinations of the heap tuple map (HTM) and the shadow copy (SC) based on tables (T1 to T4 in FIG. 7) (hereinafter referred to as the "table-based write set"). Moreover, FIG. 8 shows a method of sending, to the higher-level master node, a single write set in which table numbers are indicated in the combination of the heap tuple map (HTM) and the shadow copy (SC) (hereinafter referred to as the "integrated write set").

Even with the foregoing table-based write set (FIG. 7) and integrated write set (FIG. 8), since it is known that the row number to which the DELETE instruction is applied and the old row number to which the UPDATE instruction is applied will be deleted based on the generation of the heap tuple map (HTM), it is possible to only write the new instruction as the shadow copy (SC), and this is the same as in the case of a single table.

In the example shown in FIG. 7, for example, on the assumption that the tables T1 and T2 are respectively updated in a predetermined lower-level master node based on a certain transaction, a combination of the heap tuple map (HTM) and the shadow copy (SC) is generated for the respective tables T1 and T2, and the bundle of these combinations becomes the table-based write set.

When the table-based write set is received by the higher-level master node, the higher-level master node reflects the contents of the table-based write set in its own database. Here, the higher-level master node foremost accesses its own database based on the heap tuple map (HTM) of each table and checks whether that tuple has already been updated by a different table-based write set (including a normal write set and the integrated write set described later). Here, when the tuple has not been updated, the higher-level master node refers to the shadow copy of each table in the table-based write set, and updates the tuple. Meanwhile, when it is detected that the tuple has already been updated, the entire table-based write set is aborted. Specifically, when the contention with a corresponding row of the higher-level master node relative to the heap tuple map (HTM) of one table (for example, T1) is detected; that is, when the corresponding row of the heap tuple map (HTM) of the table T1 has already been updated by a different write set or the like, the combination of the entire table-based write set (both the combination of the heap tuple map (HTM) and the shadow copy (SC) of the table T1 and the combination of the heap tuple map (HTM) and the shadow copy (SC) of the table T2) is aborted. The reason for this is as follows. Specifically, since the combination of the heap tuple map (HTM) and the shadow copy (SC) of each table contained in the table-based write set is generated based on a single transaction, an inconsistency will arise in the database contents unless all processing of that transaction is reflected, or not reflected at all, in the database of the higher-level master node. Accordingly, if it is detected that even the heap tuple map (HTM) regarding one table (T1) contends with the update information of the database of the higher-level master node, the entire table-based write set (combinations of the heap tuple map (HTM) and the shadow copy (SC) corresponding to the respective tables T1 and T2) needs to be aborted.

The same applies to cases of applying, to the higher-level master node, an integrated write set in which table numbers are indicated in the combination of the heap tuple map (HTM) and the shadow copy (SC) shown in FIG. 8. In other words, when the integrated write set of FIG. 8 is received by the higher-level master node, the higher-level master node checks whether the corresponding row of the table corresponding to the table number contained in the respective entries of the heap tuple map (HTM) has already been updated by a different integrated write set or the like (a normal write set or the foregoing table-based write set). Here, when the corresponding row has not been updated, the higher-level master node refers to the shadow copy of the integrated write set, and updates the tuple of the corresponding table. Meanwhile, when it is detected that the corresponding row has already been updated, the entire integrated write set is aborted. For example, when the corresponding row of the heap tuple map (HTM) of the table T1 has already been updated by another integrated write set or the like (including a normal write set and the foregoing table-based write set), the entire integrated write set is aborted.

As described above, when the higher-level master node is updated in the lower-level master node based on the table-based write set or the integrated write set (cases of FIG. 7 and FIG. 8) including information of a plurality of tables, the transaction log that is generated with the higher-level master node also becomes a format in which a table number is added. FIG. 9 shows one such example.

Figure 9:
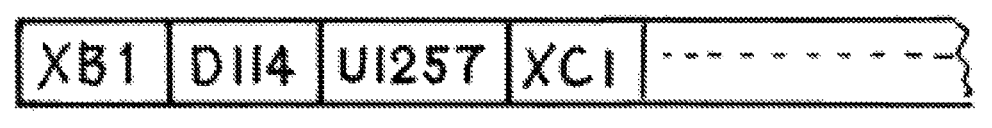

According to FIG. 9, the transaction log formats are "XB1", "D114", "U1257", "XC1", and each of these formats has the following meaning.

Subsequent to the start instruction (XB1) of the transaction 1, logs combining the instruction number and the table number and the row number are sequentially generated. For example, row number 4 of the table 1 is foremost deleted as the DELETE instruction (D1) of the transaction 1 (D114), row number 5 of the table 2 is subsequently deleted and row number 7 is added as the UPDATE instruction (U1) of the transaction 1 (U1257), and, finally, the commitment instruction (XC1) thereof is issued.

This transaction log is distributed from the communication module (11d) to the lower-level master node (MS201) which has sent the write set, as well as to all lower-level master nodes (MS202 . . . MS20n and MS301, MS302 . . . MS30n).

The lower-level master nodes that received the transaction log copy (replicate) such transaction log in their own database.

Specifically, when a lower-level master node (M202, for instance) receives the transaction log shown in FIG. 9 with the communication module (11d), it activates the transaction log processing unit (11c) and replicates the transaction log in its own master database (11a). Consequently, a deletion pointer is given to row number 4 of the table 1, a deletion pointer is given to row number 5 of the table 2, and a new row number 7 is added as the transaction 1.

The present disclosure was explained above based on an embodiment, but the present disclosure is not limited thereto. Modified examples of the present disclosure are explained below.

Case where the Database is Updated in the Higher-Level Master Node MS101

With respect to the processing in a case where an update instruction of a master database is issued in a lower-level master node (MS201, for instance), as explained in FIG. 2, a write set (when there are a plurality of tables, the table-based write set shown in FIG. 7 or the integrated write set shown in FIG. 8) configured from a heap tuple map (HTM, heap file) and a shadow copy (SC) is generated in a backend memory (BEM). However, when an update instruction of a master database is issued in a higher-level master node (MS101), a write set is not generated since it is not necessary to notify a higher-level node. That is, in the foregoing case, with the higher-level node (MS101), as shown in the left diagram of FIG. 5, update data is directly written into the master database (11a), and the transaction log (when there are a plurality of tables, the transaction log shown in FIG. 9) shown in FIG. 6 is generated. This transaction log is distributed to the lower-level master nodes, and the lower-level master nodes that received the transaction log replicate such transaction log in their own master database.

When Search Processing is Executed at the Stage where the Lower-Level Master Mode is Generating a Write Set In the lower-level master node (MS201, for example), when a search is executed to the master database of that lower-level master node at the stage when a write set is being generated as shown in FIG. 4, there will be no problem if the search is targeting a row number other than the row number in which the write set was generated. However, if the search is targeting the corresponding row (row number 4 and row number 5 in this example), they cannot be used as the search target since these row numbers have already been deleted.

Here, the write set that is generated in the lower-level master node cannot become a search target since the same applies to cases that are based on the premise of the plurality of tables as shown in FIG. 7 and FIG. 8.

The following two measures may be considered in the foregoing case.

The first type is where the database processing unit (11b) refers to the master database (11a), and thereafter refers to the heap tuple map (HTM). In addition, whether the search target row number has been entered in the heap tuple map (HTM) is checked. If there is such an entry, whether that entry is a deletion or update is determined, and, if the entry is an update, the shadow copy (SC) is referred to and the entry (sc1) of that shadow copy (SC) is set as the search target. For example, in the case shown in FIG. 4, when the search target is row number 3, the database processing unit (11b) refers to the heap tuple map (HTM) in the write set in the backend memory (BEM) built in the main memory (MM), and determines whether the corresponding row (row number 3) has been entered. In the example of FIG. 4, the corresponding row has not been entered. In the foregoing case, the database processing unit (11b) directly accesses the master database 11a and searches the corresponding row (row number 3).

Meanwhile, if the search target is row number 4 in the example shown in FIG. 4, the database processing unit (11b) detects that the corresponding row (row number 4) has been entered upon referring to the heap tuple map (HTM) in the write set. In the foregoing case, even if the master database 11a is accessed, since the remaining corresponding row is already a target of the update instruction for deletion, it cannot become a search target. The database processing unit (11b) refers to the heap tuple map (HTM) and detects that the corresponding row (row number 4) has been deleted. Accordingly, since the search target row has been deleted, the database processing unit (11b) does not set the corresponding row as the search target.

Meanwhile, in the example shown in FIG. 4, if the search target is row number 5, as described above, the database processing unit (11b) refers to the heap tuple map (HTM) and detects that the entry (sc1) of the shadow copy (SC) corresponding to the corresponding row (row number 5) has been created.

Here, the database processing unit (11b) may refer to the shadow copy (SC) and set the entry (sc1) which rewrote the row number 5 as the search target.

While the case of updating a single table was explained above, the same applies to the case of updating a plurality of tables.

Specifically, in the case of the table-based write set of FIG. 7, the combination of the heap tuple map (HTM) and the shadow copy (SC) corresponding to the search target table is extracted and used.

After referring to the search target table of the master database, the heap tuple map (HTM) corresponding to that table is referred to, and whether the row number corresponding to the search has been entered is checked. When there is no entry, the corresponding row of the search target table of the master database is set as the search target. When there is an entry, whether that entry is to be deleted or updated is determined and, when the entry is to be updated, the shadow copy (SC) is additionally referred to, and the entry of that shadow copy (SC) is set as the search target. When the entry is to be deleted, the corresponding row is not set as the search target.

In the case of the integrated write set of FIG. 8, entries to which is assigned the table number corresponding to the search target table among the entries of the heap tuple map (HTM) and the shadow copy (SC) are extracted and used.

After referring to the search target table of the master database, the entries of the heap tuple map (HTM) corresponding to the extracted search target table are referred to, and whether the row number corresponding to the search is included is checked. When there is no entry, the corresponding row of the search target table of the master database is set as the search target. When there is an entry, whether that entry is to be deleted or updated is determined and, when the entry is to be updated, the entry of the extracted shadow copy (SC) is additionally referred to, and that entry is set as the search target. When the entry is to be deleted, the corresponding row is not set as the search target.

The second type is here the database processing unit (11b) foremost refers to the master database (11a), and thereafter refers to the overall heap tuple map (HTM). Here, whether the row to be searched has been entered is checked, and it is assumed that all entered row numbers (row numbers 4 and 5 in this case) have been deleted (to be excluded from the search target). Subsequently, the database processing unit 11b refers to the shadow copy (SC), and refers to the entry (sc1) that was added in the shadow copy and sets this as the search target.

In the case of the table-based write set of FIG. 7, the same processing is performed to the combination of the heap tuple map (HTM) and the shadow copy (SC) corresponding to the search target table.

In the case of the integrated write set of FIG. 8, the entries to which is assigned the table number corresponding to the search target table are extracted among the entries of the heap tuple map (HTM) and the shadow copy (SC), and the same processing is performed using these entries.

When Contention Occurs while Update of the Lower-Level Master is being Performed with the Transaction Log from the Higher-Level Master When an instruction for updating the database of the lower-level master is being executed to the corresponding row while replication is being performed on the database of the lower-level master node based on the transaction log distributed from the higher-level master, contention will occur.

Specifically, a corresponding case would be when a transaction log including an entry of row number 5 is distributed from the higher-level master while row numbers 4 and 5 are being updated based on the update instruction to the lower-level master node.

In the foregoing case, even if the write set created in the lower-level master node is sent to the higher-level master node, since the transaction log relating to the corresponding row has already been distributed to the higher-level master node, the write set is aborted since contention with the higher-level master node is detected. Accordingly, contention in that lower-level master node may be ignored. Note that the same applies to the cases (shown in FIG. 7 and FIG. 8) where the write set generated with the lower-level master node corresponds to a plurality of tables.

Meanwhile, as another method of resolving the contention in the lower-level master nodes, when a write set (heap tuple map (HTM) and shadow copy (SC)) is created in a lower-level master node, these may be registered in a backend memory (BEM) of that lower-level master node so that these areas can be referred to from two or more processes (specifically, the replication process and the write set generation process). In other words, in the lower-level master node, desirably the write set, and more specifically only the heap tuple map (including the table-based write set and the integrated write set depicted in FIG. 7 and FIG. 8), is stored in the shared memory.

In the foregoing case, as a result of referring to the write set in the backend memory (BEM) upon the lower-level master node executing the replication of the master database 11a, the write set that contradicts the update instruction can be aborted at the stage of the lower-level master node. Specifically, the transaction log processing unit 11c refers to the backend memory (BEM), and aborts the transaction that is generating the heap tuple map (HTM) when the corresponding row to be updated based on the update instruction is contained in that heap tuple map (HTM).

The same applies when the write set generated in the lower-level master node corresponds to a plurality of tables (shown in FIG. 7 and FIG. 8). In the case of the table-based write set shown in FIG. 7, when the lower-level master node generates the table-based write set (bundle of the heap tuple map (HTM) and the shadow copy (SC)), these may be registered in the backend memory (BEM) of the lower-level master node, and enable the areas thereof to be referenced from two or more processes (specifically, the replication process and the generation process of the table-based write set). In other words, in the lower-level master node, it is desirable to store the table-based write set, more specifically only the heap tuple map of each table, in the shared memory.

In the foregoing case, by referring to the table-based write set in the backend memory (BEM) when the lower-level master node executes the replication of the master database 11a, it is possible to abort the table-based write set that contradicts the update instruction at the stage of the lower-level master node.

The case of the integrated write set shown in FIG. 8 is the same as the case of the single table configuration. In other words, since the table number is registered in the heap tuple map, when the integrated write set (heap tuple map (HTM) and shadow copy (SC)) is generated, these are registered in the backend memory (BEM) of the lower-level master node, and the subsequent processing is the same as the case of the single table configuration.

Accordingly, by storing the heap tuple map (HTM) in a shared memory and enabling the referral thereof from a plurality of processes, contention can be prevented at the stage of the lower-level master node even in a multi master system database. In addition, since only the heap tuple map (HTM) needs to be stored in the shared memory, it will not occupy the valuable shared memory.

Embodiment 2

Another embodiment (Embodiment 2) of the present disclosure is now explained with reference to the appended drawings.

Figure 10:
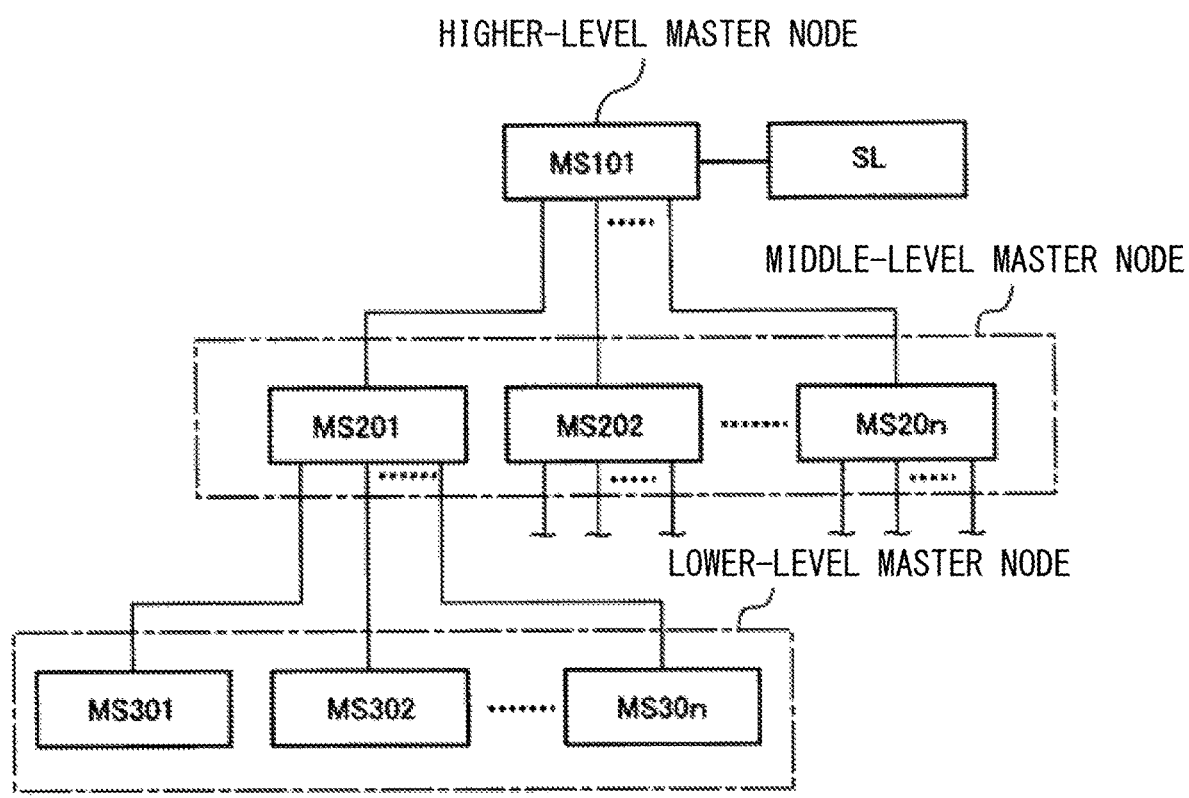
FIG. 10 is a conceptual diagram showing the database structure of the hierarchical master node of Embodiment 2.

FIG. 10 shows the structure of the hierarchical master nodes of this embodiment. As shown in FIG. 1, the node configuration where middle-level master nodes (MS201, MS202, . . . , MS20n) and lower-level master nodes (MS301, MS302, . . . , MS30n) are hierarchically provided below a higher-level master node (MS101) is adopted. Each node (information processing apparatus) includes a database. Moreover, the higher-level master node (MS101) includes a slave (SL), and the other middle-level/lower-level master nodes may also include a slave. With this kind of master/slave configuration, the update management technology of Japanese Patent Application Publication No. 2006-293910 (earlier application by the present applicant) may be applied for updating the databases between the higher-level master node and the lower-level master nodes.

While the foregoing earlier application only needs to copy (replicate) the transaction log data of the master node to the lower-level nodes, PCT/JP2011/068057 (earlier unpublished application by the present applicant) is unique in that attention was focused on the fact that, when an update instruction is also being executed with the lower-level master nodes in a database configured from hierarchical multi master nodes, the consistency of all lower-level nodes cannot be maintained only by referring to the transaction log from the higher-level node, whereby the lower-level master node updated the higher-level master node by sending, to the higher-level master node, the shadow copy and the heap tuple map of the database expanded in its own memory as a write set. Nevertheless, with the foregoing related art, cases of deleting the table itself or adding changes to the table structure in the higher-level master node were not considered. Thus, there was a possibility that the consistency of the database cannot be maintained due to updates based on the write set. This embodiment describes a technique for maintaining the consistency of the entire multi master node structure by utilizing the lock function of the database in the foregoing case. This is explained below.

Figure 11:
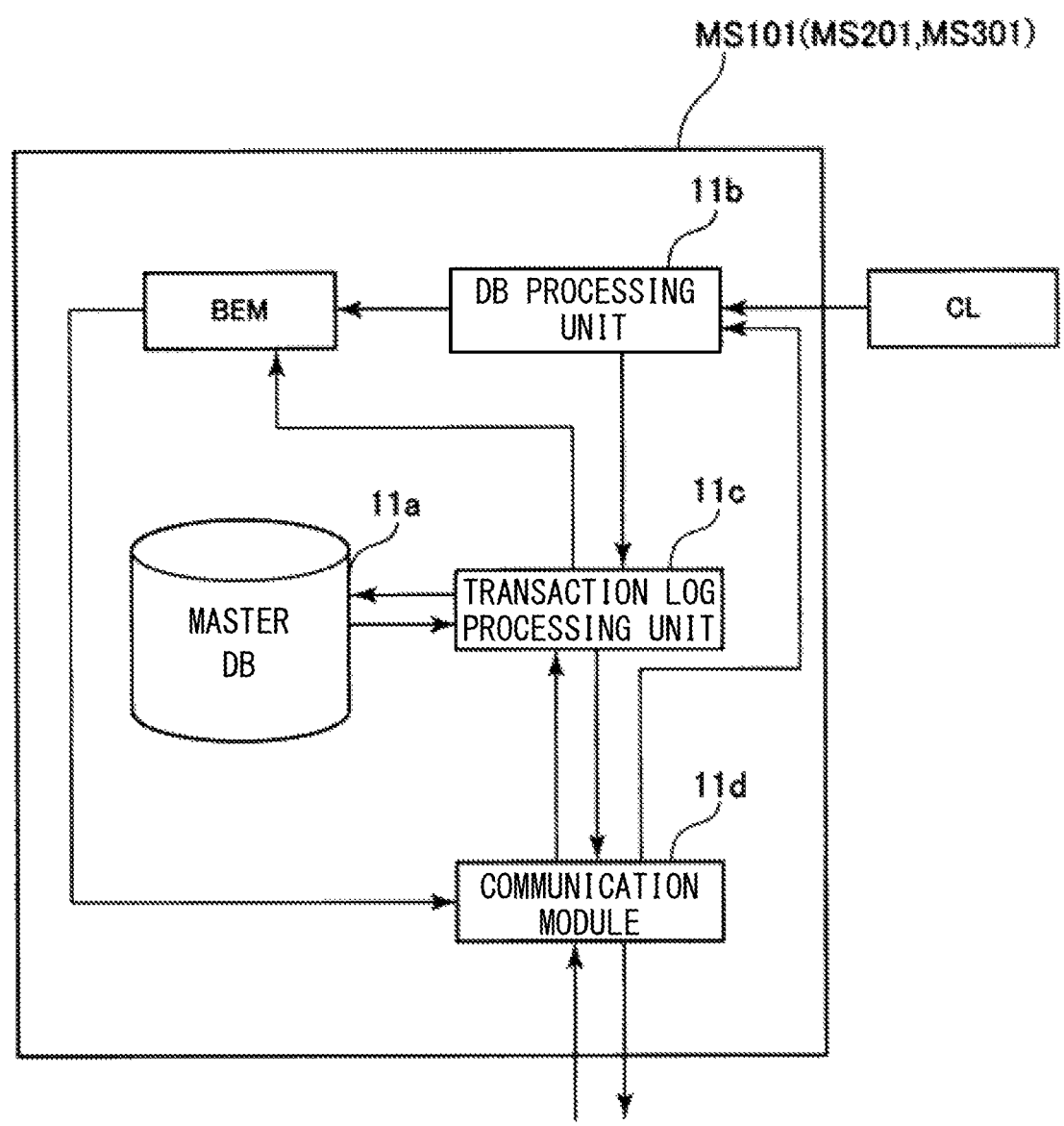
FIG. 11 is a functional block diagram of the master node of Embodiment 2.

FIG. 11 is a functional block diagram of the middle-level master node (MS201) and the lower-level master node (MS301), and the higher-level master node (MS101) also has similar functions.

Figure 12:
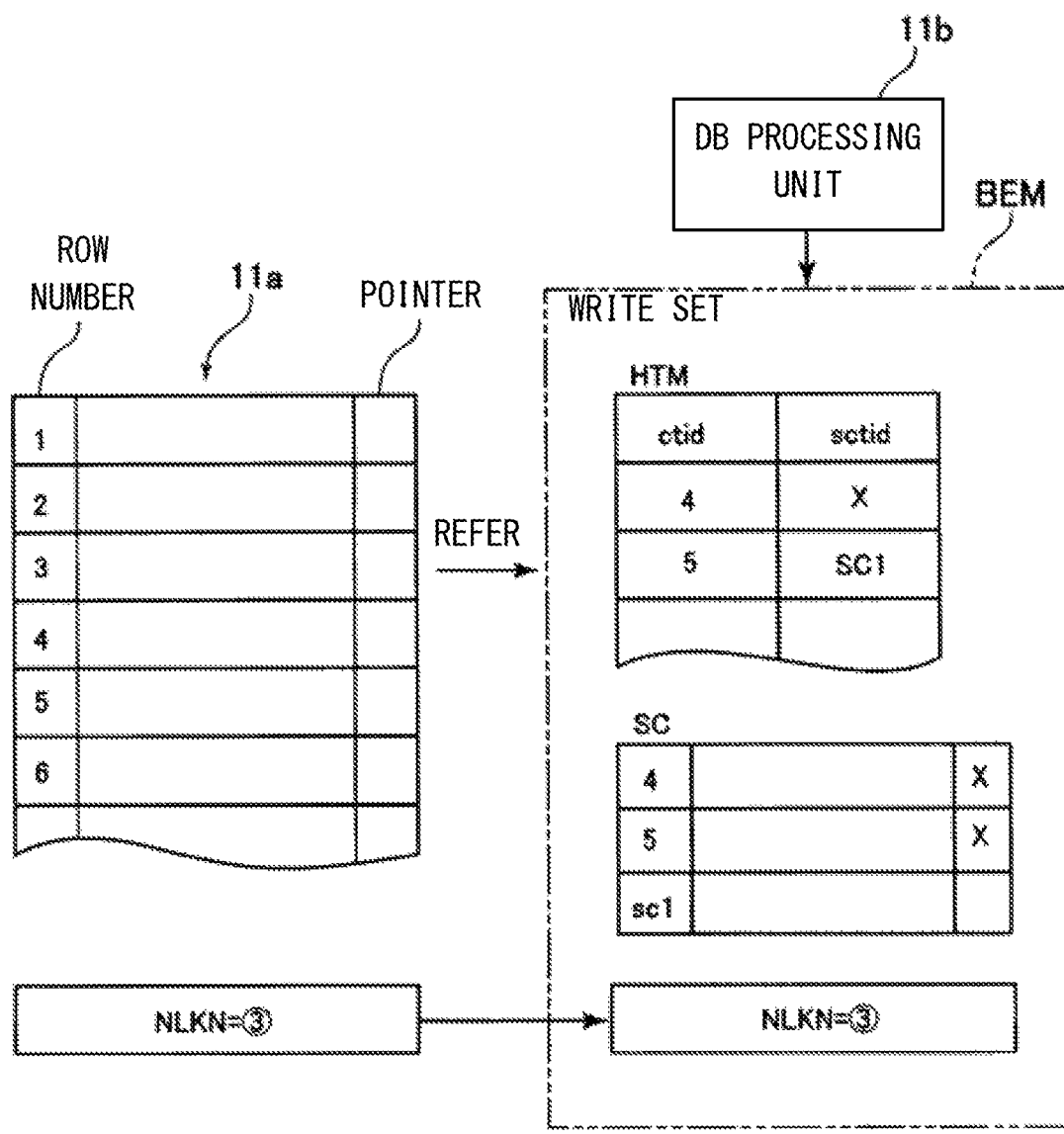
FIG. 12 is a diagram showing the relationship between the page of the database of the lower-level master node of Embodiment 2 and the generated write set (heap tuple map (HTM) and shadow copy (SC))
Figure 13:
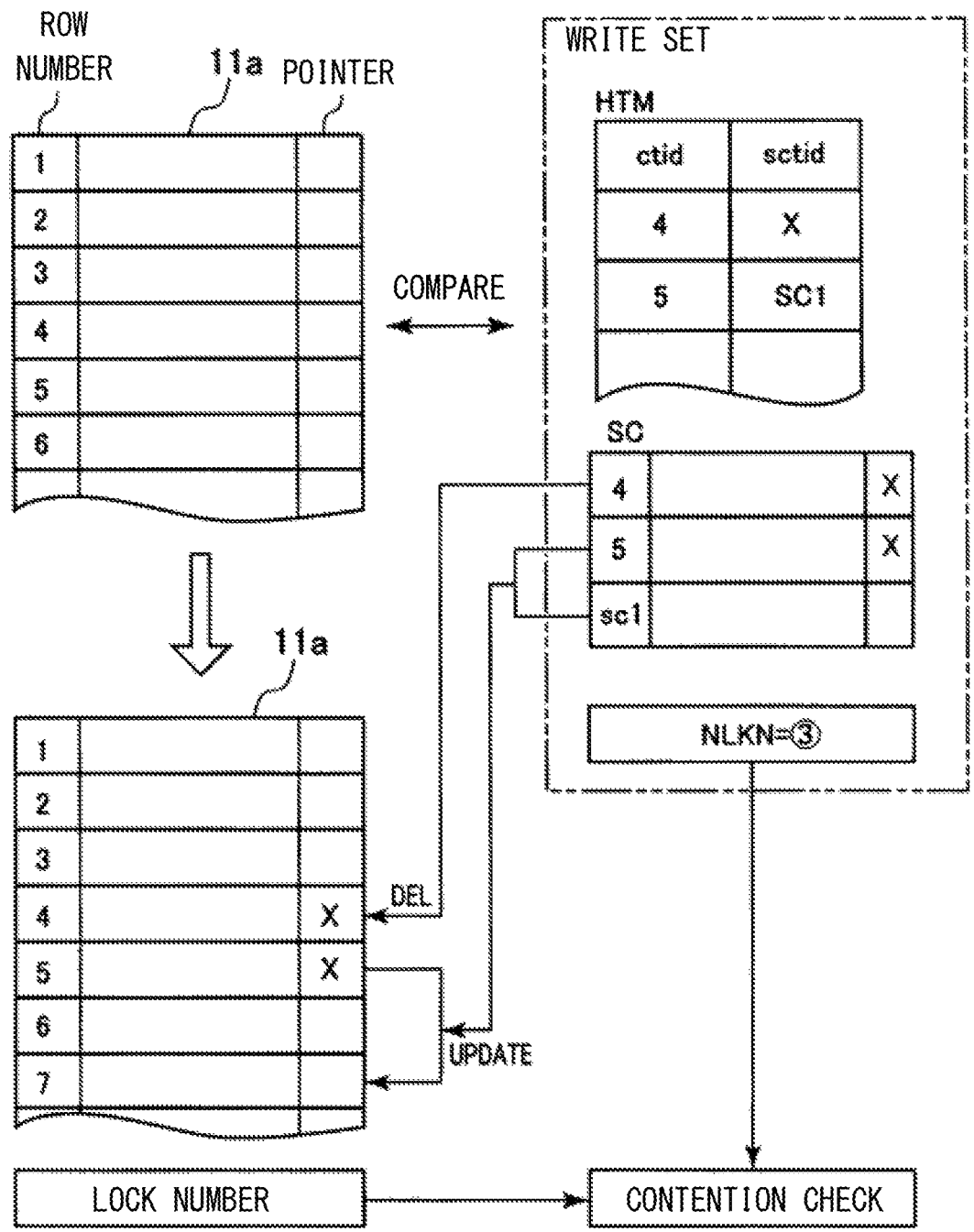
FIG. 13 is a diagram showing the relationship between the write set and the master database (11a) of Embodiment 2.

As shown in FIG. 11, when an instruction for updating the database is input from a client (CL), a database processing unit (11b) generates a write set in a backend memory (BEM) created in a main memory not shown. This write set is configured from a heap tuple map (HTM) and a shadow copy (SC) as shown in FIG. 12. Here, let it be assumed that update instructions for deleting (DELETE) row number 4 of a master database (11a) and rewriting (UPDATE) row number 5 with a new value (sc1) were input.

Here, the database processing unit 11b sends the write set, which was generated in the backend memory (BEM), to the higher-level master via a communication module (11d) without directly writing data into a master database (11a) while referring to the master database (11a).

This kind of generation and sending of the write set is performed in the middle-level master nodes (MS201, MS202 . . . MS20n) and the lower-level master nodes (MS301, MS302 . . . MS30n).

Here, when the higher-level master node (MS101) receives an instruction that requires the exclusive control of the table; for instance, change of table structure or deletion of table, an instruction for locking that table is executed and the corresponding lock number is stored. For example, when instructions for locking table 1 and table 3 and table 2 and table 4 . . . are sequentially executed, the lock number corresponding to table 1 is No. 1, the lock number corresponding to table 3 is No. 2, the lock number corresponding to table 2 is No. 3, and the lock number corresponding to table 4 is No. 4, and these lock numbers (1 to 4) are stored.

When the higher-level master node receives an instruction for locking the table of the database as described above, this may be notified independently as locking information to the middle-level master node and the lower-level master node, or stored in the transaction log generated in the higher-level master node and notified to the middle-level master node and the lower-level master node as described later. The lower-level master node that received the locking information from the higher-level master node checks whether there is a transaction that contends with the locking information; for example, a transaction that is updating the table that is the target of the locking information, and when there is such a transaction, aborts the transaction in the lower-level master node since the locking information generated in the higher-level master node is given preference.

A case where there is a transaction that is updating the table that is the target of the locking information was explained above as an example of where the transaction is in contention, but the contention of a transaction is not limited thereto. For example, when the locking information notified from the higher-level master node is locking information for locking the table upon deleting that table, even in cases where there is a transaction which merely refers to the corresponding table in the lower-level master node, since that transaction will be in contention with the locking information, this kind of transaction in the lower-level master node is aborted.

Subsequently, a transaction log (refer to FIG. 14) storing the locking information is generated. The transaction log shown in FIG. 14 means that the instruction is started in XB1, table 1 is locked in LT1, table 1 is deleted in DT1, and commitment thereof is performed in XC1. A transaction log repeatedly stores a group of instructions as those described above. In this embodiment, a sequential number is given to each locking instruction for managing the locking instruction. For example, LT1 corresponds to table 1 and is the No. 1 locking instruction, LT3 corresponds to table 3 and is the No. 2 locking instruction, LT2 corresponds to table 2 and is the No. 3 locking instruction. In other words, in this example, locking numbers 1 to 4 are sequentially given in the order of LT1→LT3→LT2→LT4 for managing the locking information.

Figure 14:
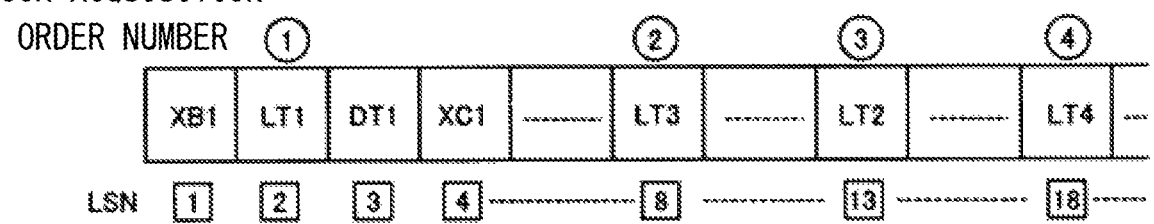
FIG. 14 is an explanatory diagram showing the transaction log that is generated by the higher-level master node of Embodiment 2.

Nevertheless, as the method of sequentially managing the locking instructions, a log sequence number (LSN) that is given to each log may also be used. In FIG. 14, LT1 is LSN=2, LT3 is LSN=8, LT2 is LSN=13, and LT4 is LSN=18.

This transaction log is sent from the higher-level master node (MS101) to the middle-level/lower-level master nodes (MS201, MS202, MS20*n*, MS301, MS302, MS30*n* . . . ).

When the respective middle-level/lower-level master nodes receive the transaction log, they replicate the contents of the transaction log in their own database.

Here, when only the locking instructions are explained, the locking instructions LT1, LT3, LT2, LT4 are sequentially executed and the tables in their own shared memory are caused to be an exclusively locked state, and the memory access to the middle-level/lower-level master nodes based on other transactions is restricted. Here, the lower-level master node checks whether there is a transaction that contends with the locking instruction (locking information); for example, a transaction that is updating the table that is the target of the locking instruction, and when there is such a transaction, aborts the transaction in the lower-level master node since the locking information generated in the higher-level master node is given preference.

Figure 15:
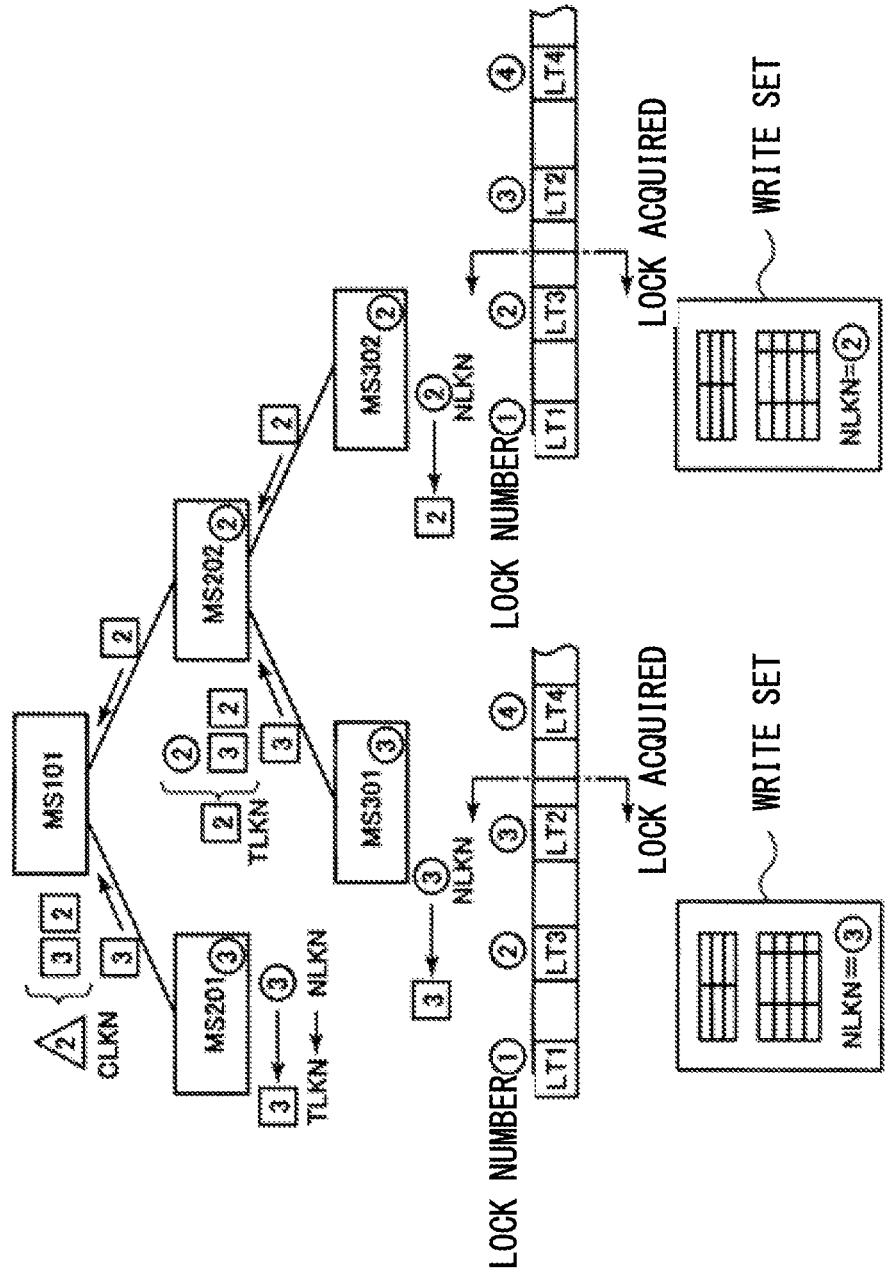
FIG. 15 is an explanatory diagram of the method of propagating the locking information in the database structure of the hierarchical master node of Embodiment 2.

When the tables in the lower-level master node are sequentially locked based on the locking instructions (LT1, LT3, LT2, LT4 . . . ), the locking number of the maximum value of the locked table in the lower-level master node is notified as the node lock number (NLKN) to the middle-level/higher-level master nodes. In FIG. 15, since the lower-level master node (MS301) has completed up to the No. 3 locking instruction (LT2), NLKN=3 (circled 3 in FIG. 15), and since the lower-level master node (MS302) has completed up to the No. 2 locking instruction (LT3), NLKN=2 (circled 2 in FIG. 15).

FIG. 12 shows the relationship of the master database (11*a*) in the lower-level master node (MS301), and the write set. The master database (11*a*) in the lower-level master node is configured from row numbers, instructions, and a pointer, and is a recordable database in which a row number is added each time a new instruction is given from the client terminal (CL). FIG. 4 shows the case explained above where row number 4 is deleted (DELETE) and row number 5 is rewritten according to the new instruction (UPDATE to sc1).

In the lower-level master node (MS301), when this kind of update instruction is given to the master database (11*a*) based on instructions from the client terminal (CL), as described above, a write set configured from a heap tuple map (HTM, heap file) and a shadow copy (SC) is generated in the backend memory (BEM).

The original row number (ctid) and the row number (sctid) of the new row are associated and registered in the heap tuple map (HTM). The heap tuple map (HTM) is additionally generated each time the database is updated. Note that, since the row number to which the instruction (sc1) of row number 5 is to be written is still unknown at this stage, a new instruction (sc1) is written in sctid.

Meanwhile, the shadow copy of the row number to be rewritten by referring to the master database (11*a*) is generated in the shadow copy (SC). Here, since the row number to be newly added is still unknown at this stage, a new instruction (sc1) is written in the row number.

Note that, at this stage, since the database processing unit (11*b*) of the lower-level master node (MS301) knows that row number 4 to which the DELETE instruction is applied and old row number 5 to which the UPDATE instruction is applied will be deleted based on the generation of the heap tuple map (HTM), it is also possible to only write the new instruction (sc1) as the shadow copy (SC).

Figure 16:
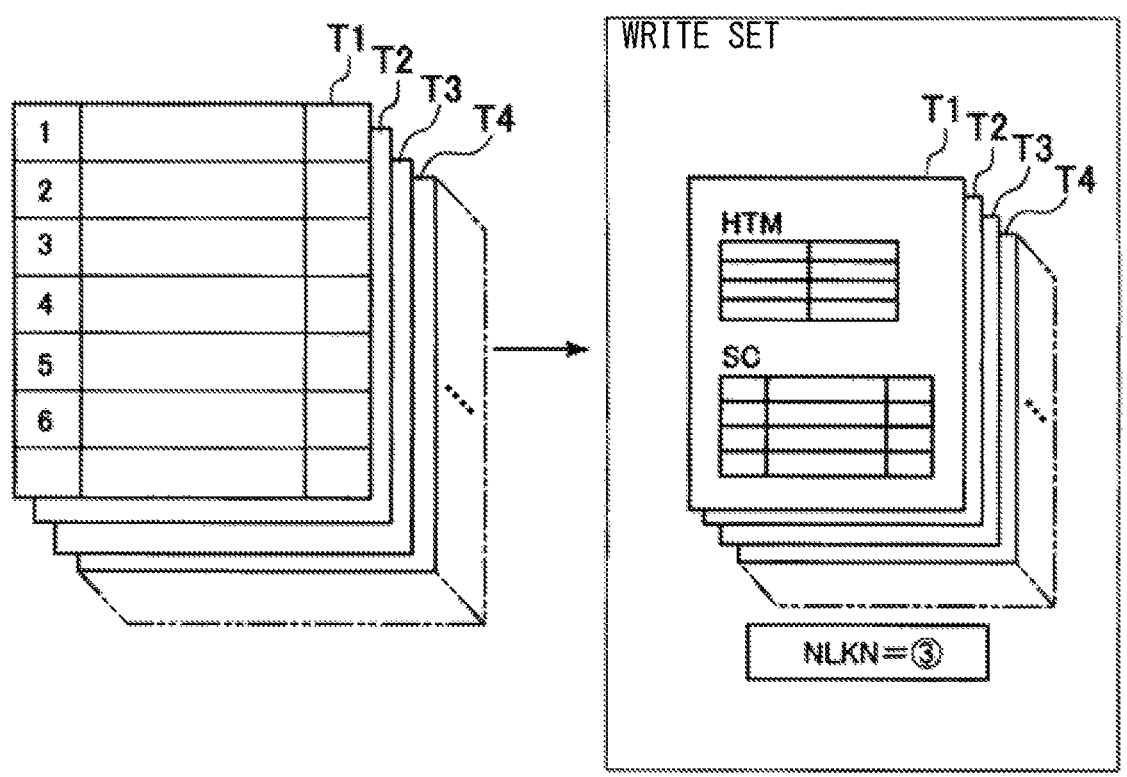
FIG. 16 is an explanatory diagram of a case where the write set is created for each table in Embodiment 2.
Figure 17:
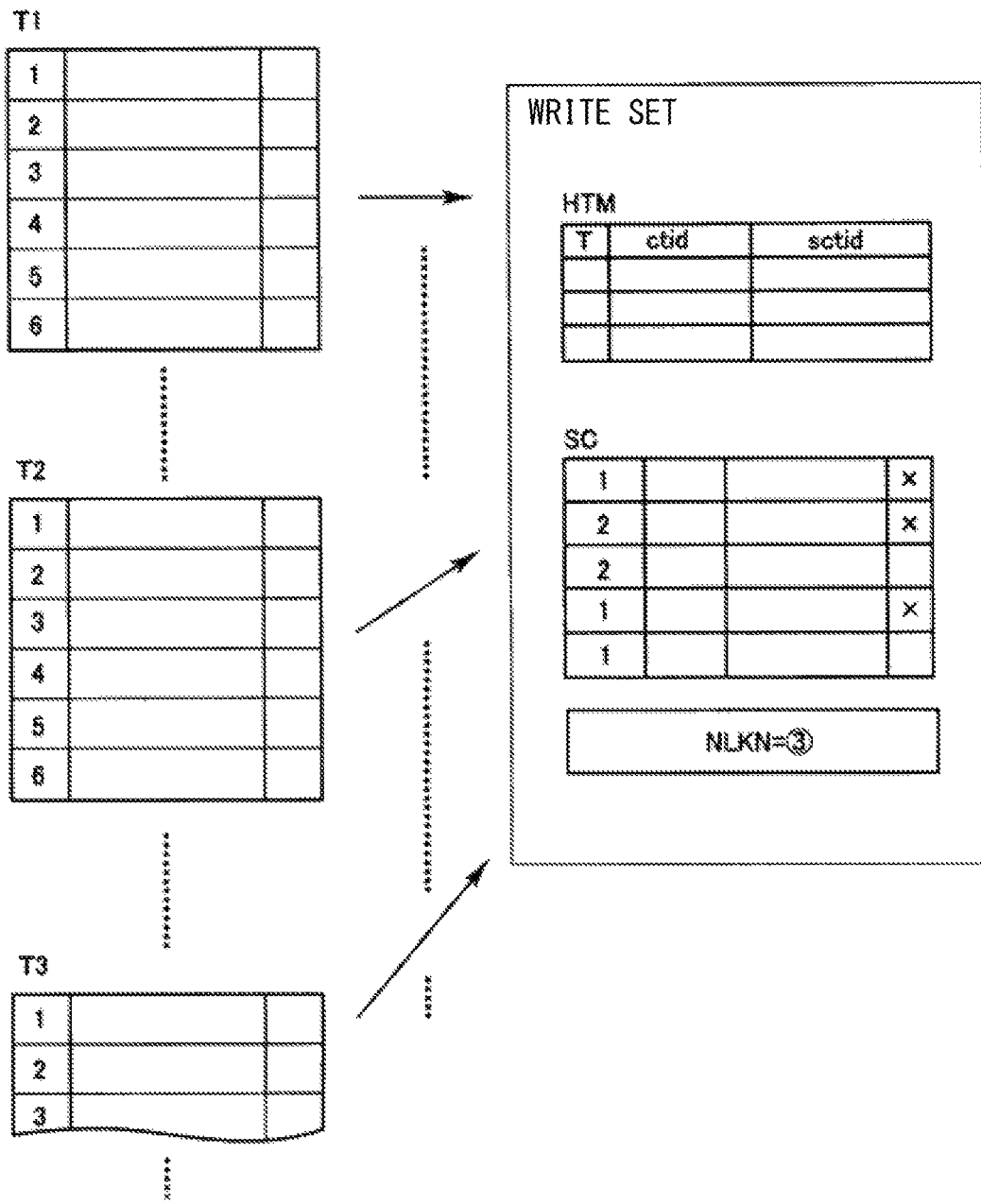
FIG. 17 is an explanatory diagram of a case where table information is recorded in the write set in Embodiment 2.

While this kind of write set is created for each table as shown in FIG. 16, the table number (T) may be registered by being associated with the row number (ctid) of the heap tuple map (HTM) in a single write set as shown in FIG. 17.

The write set is also stored in the foregoing node lock number (NLKN). This node lock number (NLKN) is the maximum value of the locking number that is executed in correspondence to the locking instructions (LT1, LT3, LT2, LT4) stored in the transaction log (refer to FIG. 14) that was distributed (notified) from the higher-level master node (MS101) as described above.

To repeat the foregoing explanation, when the lower-level master node (MS301) receives the transaction log as shown in FIG. 14 and has completed up to the No. 3 locking instruction (LT2) based on the locking instructions (LT1, LT3, LT2, LT4) of the transaction log, the node lock number (NLKN) becomes "3" (NLKN=3), and is stored in the write set that is generated in the lower-level master node (MS301) as shown in FIG. 15. Meanwhile, when the lower-level master node (MS302) has completed up to the No. 2 locking instruction (LT3), the node lock number (NLKN) becomes "2" (NLKN=2), and is stored in the write set that is generated in the lower-level master node (MS302) as shown in FIG. 15.

The write set generated as described above is sent from the lower-level master nodes (MS301, MS302) to the higher-level master node (MS101). While the write set will pass through the middle-level master node (MS202), the middle-level master node (MS202) does not perform any kind of processing to the write set.

In the higher-level master node (MS101), when the database processing unit 11*b* (central processing unit (CPU)) receives the write set from the lower-level master nodes (MS301, MS302), it reads the heap tuple map (HTM) from the received write set, and compares it with its own master database (11*a*). In FIG. 12, whether the contents of the target tuples (row numbers 4, 5 and 7 in this case) have been updated in the master database (11*a*) is verified. Here, since row numbers 4 to 6 have not yet been updated, a deletion pointer is given to row number 4, and a deletion pointer is also given to old number 5 to be rewritten. In addition, a new instruction (sc1) is written in new row number 7.

Here, in this embodiment, all write sets are not compared with the master database (11a). In other words, the node lock number (NLKN) stored in the write set is read prior to the foregoing comparison step, locking information corresponding to the lock numbers that are greater than the node lock number (NLKN) are referred to, and whether that locking information and the table that is to be corrected with the write set are in contention is verified. When they are in contention, the write set is aborted and that write set is excluded from the comparison target. The reason why this kind of verification is performed is as follows. Specifically, even when the tables in the higher-level master node (MS101) are locked, if the lower-level master node updated the tuple of those tables before the tables were locked and such information reaches the higher-level master node (MS101) as a write set and the tables including that tuple are updated, the consistency of the master database (11a) may be lost as a result of the foregoing transaction contending with the change in table structure or deletion of tables that were performed by the higher-level master node (MS101) while the tables were being locked.

With the method of detecting contention using the heap tuple map (HTM) described later, since this kind of breakdown in the consistency of the database cannot be detected, it is necessary to compare the locking information and detect the contention in advance.

Meanwhile, even with a write set that was not aborted in the foregoing comparison with the lock number, when the corresponding row of the master database (11a) has already been updated by a different write set as a result of comparing the heap tuple map (HTM) in the write set and the master database (11a) of the higher-level master node, the write set is aborted since this will contend with the update of the master database (11a).

The mechanism of the lower-level master nodes (MS301, MS302) notifying the locking result information corresponding to the locking instruction that was replicated in the transaction log being notified to the higher-level master node (MS101) via the middle-level master node (MS202), separate from the write set, is now explained with reference to FIG. 15.

The lower-level master nodes (MS301, 302) sequentially replicate the locking instructions (LT1, LT3, LT2,LT4 . . . ) stored in the foregoing transaction log, and obtain the locking result information thereof. Here, specifically, the locking instructions may be managed with the locking instruction number that is given in the locking instruction order. In other words, the locking instruction number of the locking instruction (LT1) of table 1 is "1", the next locking instruction number of the locking instruction (LT3) of table 3 is "2", the next locking instruction number of the locking instruction (LT2) of table 2 is "3", and the next lock number of the locking instruction (LT4) of table 4 is "4".

In addition, the respective lower-level master nodes (MS301, MS302) manage the maximum value of the numerical values of the locking instruction numbers of the locked tables with the node lock numbers (NLKN) as described above.

The respective node lock numbers (NLKN) are sent from the respective lower-level master nodes (MS301, MS302) to the middle-level master node (MS202) of an upper tier. The middle-level master node (MS202) compares the node lock number (NLKN=2) in its possession and the node lock numbers (NLKN=3, 2) notified from the respective lower-level master nodes, and updates the smallest value (2 in this case) as its tree lock number (TLKN=2).

Note that, in FIG. 15, since the middle-level master node (MS201) has no lower-level master node under its control, its node lock number (NLKN=3) directly becomes the tree lock number (TLKN=3) with the middle-level master node (MS201) as the apex.

The respective middle-level master nodes (MS201, MS202) send their respective tree lock numbers (TLKN=3, 2) to the higher-level master node (MS101). The higher-level master node (MS101) that received the foregoing tree lock numbers updates the minimum value thereof (TLKN=2 in this case) as the cluster lock number (CLKN=2).

Since the cluster lock number (CLKN=2) is the minimum value of all node lock numbers (NLKN) of the entire cluster that was collected from all hierarchies as described above, the higher-level master node (MS101) can comprehend the locking status of the entire cluster based on the cluster lock number (CLKN=2). In other words, when the cluster lock number (CLKN) is 2, this means that the locking instructions that are equal to or smaller than this number have been completed in all nodes.

Accordingly, the higher-level master node (MS101) recognizes that the locking instruction having a lock number that is equivalent to or smaller than the cluster lock number is complete.

The reason why the node lock numbers (NLKN) of the lower-level master nodes (MS301, 302) stored in the write set and the locking instruction numbers stored in the higher-level master node are compared in addition to comparison with the tree lock numbers (TLKN) that are sequentially received from the middle-level/lower-level master nodes is as follows.

Generally speaking, time is required until the locking result information (node lock number: NLKN) executed by the lower-level master nodes (MS301, 302) reaches the higher-level master node (MS101) while updating the tree lock number (TLKN) of the middle-level node. In particular, with a database having a complicated tree hierarchical structure, the processing efficiency will deteriorate considerably due to the foregoing delay in arrival. Specifically, since the minimum values are compared in the respective hierarchies, when there is even one small NLKN (for example, NLKN=2), since the cluster lock number (CLKN) will not be able to take on a large value indefinitely, the higher-level master node needs to check all write sets.

Meanwhile, since the lower-level master node (MS301) that issued the write set is set with NLKN=3, up to the No. 3 locking instruction has been completed. In other words, to the extent of this node (MS301), if only the locking information corresponding to the lock number "4" (LT4), which is greater than NLKN=3, is compared with the table information in the write set, the processing load for the comparison in the higher-level master node (MS101) can be reduced.

The present disclosure was explained above based on the embodiments, but the present disclosure is not limited thereto. For example, while the hierarchical structure of the nodes was illustrated as a three-layer structure of a higher-level master node, a middle-level master node and a lower-level master node (FIG. 10, FIG. 15 and FIG. 16), this may also be a two-layer structure of a higher-level master node and a lower-level master node. Moreover, the middle-level master node may also be two layers or more.

Moreover, while the foregoing embodiments explained an example of notifying the node lock numbers (NLKN) to the middle-level, higher-level master nodes and sequentially updating the tree lock number (TLKN) and the cluster lock number (CLKN), the configuration is not limited thereto. For example, the higher-level master node (MS101) may deem the node lock numbers (NLKN) included in the write set sent from the middle-level master nodes (MS201, MS202) or the lower-level master nodes (MS301, MS302) as respectively being the node lock numbers (NLKN) of the lower-level/middle-level master nodes, and the higher-level master node (MS101) may collect the write sets that are issued from the respective middle-level/lower-level master nodes, and deem the minimum value of all node lock numbers (NLKN) stored in the write sets as being the cluster lock number (CLKN).

The advantage of collecting the node lock numbers (NLKN) of the write sets and updating the cluster lock number (CLKN) as described above is that the notification system can be simplified since there is no need to notify the node lock numbers (NLKN) to the middle-level/higher-level master nodes separately from the write sets and send the same to the upper hierarchy while updating the respective tree lock numbers (TLKN). Meanwhile, with this method, since the higher-level master node (MS101) needs to collect the node lock numbers (NLKN) from all write sets, the load will increase.

What is claimed is:

1. A method of managing a database hierarchically including higher-level and lower-level master nodes, comprising:
generating and sending, by a database processing unit of a predetermined lower-level master node, to a higher-level master node, a table-based write set as a bundle of combinations of a shadow copy and a heap tuple map for each table of a database expanded in a memory for the database processing unit, when an instruction for updating a plurality of tables of the database is issued in the predetermined lower-level master node;
comparing, by the higher-level master node, the heap tuple map of each table in the table-based write set received from the lower-level master node and the database of the higher-level master node, and verifying whether a corresponding row of the corresponding table of the database registered as a target has been updated by a different table-based write set;
aborting the entire table-based write set sent from the predetermined lower-level master node when the update has been performed, updating the corresponding row of the corresponding table of the database of the higher-level master node using the shadow copy of each table in the table-based write set when the update has not been performed, and generating a record of this update including a table number of the higher-level master node as a transaction log;
distributing the transaction log to the lower-level master nodes including the lower-level master node which has sent the table-based write set; and
updating, by a transaction log processing unit of the lower-level master node, the corresponding row of the corresponding table of the database of the lower-level master node based on the received transaction log.

2. The method of managing a database according to claim 1,
wherein the shadow copy of each table included in the table-based write set in the lower-level master node is configured only from newly added rows.

3. The method of managing a database according to claim 1,
wherein, in a stage where the table-based write set is being generated in the lower-level master node, when search processing is performed on a table of a master database of that lower-level master node, the method executes:
referring, by the database processing unit of the lower-level master node, to the table of the master database; and
referring to the heap tuple map corresponding to the table to determine whether the corresponding row number has been entered in the search processing, setting the table of the master database as a direct search target when the corresponding row number has not been entered, and, when the corresponding row number has been entered, determining whether the entry is a deletion command or an update command, and removing the corresponding row number from the search target when the entry is the deletion command, and setting the entry of the shadow copy corresponding to the table in the heap tuple map as the search target when the entry is the update command.

4. The method of managing a database according to claim 1,
wherein, in a stage where the table-based write set is being generated in the lower-level master node, when search processing is performed on a table of a master database of that lower-level master node, the method executes:
referring, by the database processing unit of the lower-level master node, to the table of the master database;
referring to the whole heap tuple map corresponding to the table, extracting entries of row numbers to be the search target, and removing the all entered row numbers from the search target on the assumption that the row numbers have been deleted; and
referring to the shadow copy corresponding to the table, referring to row numbers of entries that have been added in the shadow copy, and adding only those row numbers as the search target.

5. The method of managing a database according to claim 1,
wherein, when the table-based write set or the integrated write set is generated in the lower-level master node, an area of a backend memory (BEM) in the lower-level master node for registering the table-based write set or the integrated write set can be referred to at least by the transaction log processing unit which executes an update instruction based on the transaction data distributed from the higher-level master node, and
when the transaction log processing unit refers to the backend memory (BEM) and when a corresponding row of a table to be updated based on the update instruction is contained in the heap tuple map (HTM) of the corresponding table of the table-based write set, or contained in the heap tuple map (HTM) of the integrated write set, the transaction log processing unit aborts the transaction that is generating that heap tuple map (HTM).

6. A method of managing a database hierarchically including higher-level and lower-level master nodes, comprising:
generating and sending, by a database processing unit of a predetermined lower-level master node, to a higher-level master node, a single integrated write set of a shadow copy and a heap tuple map containing table numbers of a database expanded in a memory for the database processing unit, when an instruction for updating a plurality of tables of the database is issued in the predetermined lower-level master node;

comparing, by the higher-level master node, the heap tuple map in the integrated write set received from the lower-level master node and the database of the higher-level master node, and verifying whether a corresponding row of the table corresponding to the table number of the database registered as a target has been updated by a different integrated write set;

aborting the entire integrated write set when the update has been performed in any of the tables, updating the table corresponding to the table number of the database of the higher-level master node using the shadow copy of the integrated write set when the update has not been performed, and generating a record of this update including a table number with the higher-level master node as a transaction log;

distributing the transaction log to the lower-level master nodes including the lower-level master node which has sent the integrated write set; and updating, by a transaction log processing unit of the lower-level master node, the corresponding row of the corresponding table of the database of the lower-level master node based on the received transaction log.

7. The method of managing a database according to claim 6,
wherein the shadow copy of the integrated write set in the lower-level master node is configured only from newly added rows.

8. The method of managing a database according to claim 6,
wherein, in a stage where the integrated write set is being generated in the lower-level master node, when search processing is performed on a table of a master database of that lower-level master node, the method executes:
referring, by the database processing unit of the lower-level master node, to the table of the master database; and
referring to the heap tuple map to determine whether the corresponding row number of the corresponding table has been entered in the search processing, setting the master database as a direct search target when the corresponding row number has not been entered, and, when the corresponding row number has been entered, determining whether the entry is a deletion command or an update command, and removing the corresponding row number from the search target when the entry is the deletion command, and setting the entry of the shadow copy in the heap tuple map as the search target when the entry is the update command.

9. The method of managing a database according to claim 6,
wherein, in a stage where the integrated write set is being generated in the lower-level master node, when search processing is performed on a table of a master database of that lower-level master node, the method executes:
referring, by the database processing unit of the lower-level master node, to the table of the master database;
referring to the whole heap tuple map, extracting entries having the table number and the row number to be the search target, and removing the all entered row numbers from the search target on the assumption that the row numbers have been deleted; and
referring to the shadow copy, referring to row numbers of entries of the table to be the search target that have been added in the shadow copy, and setting only those row numbers as the search target.

10. The method of managing a database according to claim 6,
wherein, when the table-based write set or the integrated write set is generated in the lower-level master node, an area of a backend memory (BEM) in the lower-level master node for registering the table-based write set or the integrated write set can be referred to at least by the transaction log processing unit which executes an update instruction based on the transaction data distributed from the higher-level master node, and
when the transaction log processing unit refers to the backend memory (BEM) and when a corresponding row of a table to be updated based on the update instruction is contained in the heap tuple map (HTM) of the corresponding table of the table-based write set, or contained in the heap tuple map (HTM) of the integrated write set, the transaction log processing unit aborts the transaction that is generating that heap tuple map (HTM).

* * * * *